United States Patent [19]

Pinter et al.

[11] 4,381,960

[45] May 3, 1983

[54] METHOD OF MANUFACTURING A FILAMENT WOUND ARTICLE

[75] Inventors: Warren H. Pinter, East Hartland; David H. Blaney, Tolland, both of Conn.

[73] Assignee: United Technologies Corporation, Hartford, Conn.

[21] Appl. No.: 334,609

[22] Filed: Dec. 28, 1981

[51] Int. Cl.³ .................... B65H 81/00; F03D 1/06
[52] U.S. Cl. ............................ 156/175; 156/180; 156/195; 416/230; 428/377; 428/398
[58] Field of Search ............ 156/169, 172, 173, 175, 156/180, 195, 191, 189; 428/377, 398; 416/230, 241 A, 226; 242/7.21, 7.02, 7.22, 7.23

[56] References Cited

U.S. PATENT DOCUMENTS

| 3,615,983 | 10/1971 | Palfreyman et al. | 156/175 |
| 4,081,220 | 3/1978 | Andrews | 416/226 |
| 4,089,727 | 3/1978 | McClain | 156/173 |
| 4,247,258 | 1/1981 | Griffee, Jr. et al. | 416/226 |
| 4,273,601 | 1/1981 | Weingart | 156/189 |

Primary Examiner—Michael W. Ball
Attorney, Agent, or Firm—John Swiatocha

[57] ABSTRACT

A method of manufacturing a filament wound article is practiced by winding overlying filamentary layers on a form such that those portions of the wound layers which are covered by overlying layers include incomplete or discontinuous portions thereof whereby portions of the layers which are not covered by overlying wound layers are of a minimum thickness for enhanced accuracy in the approximation of a desired smooth thickness profile.

6 Claims, 11 Drawing Figures

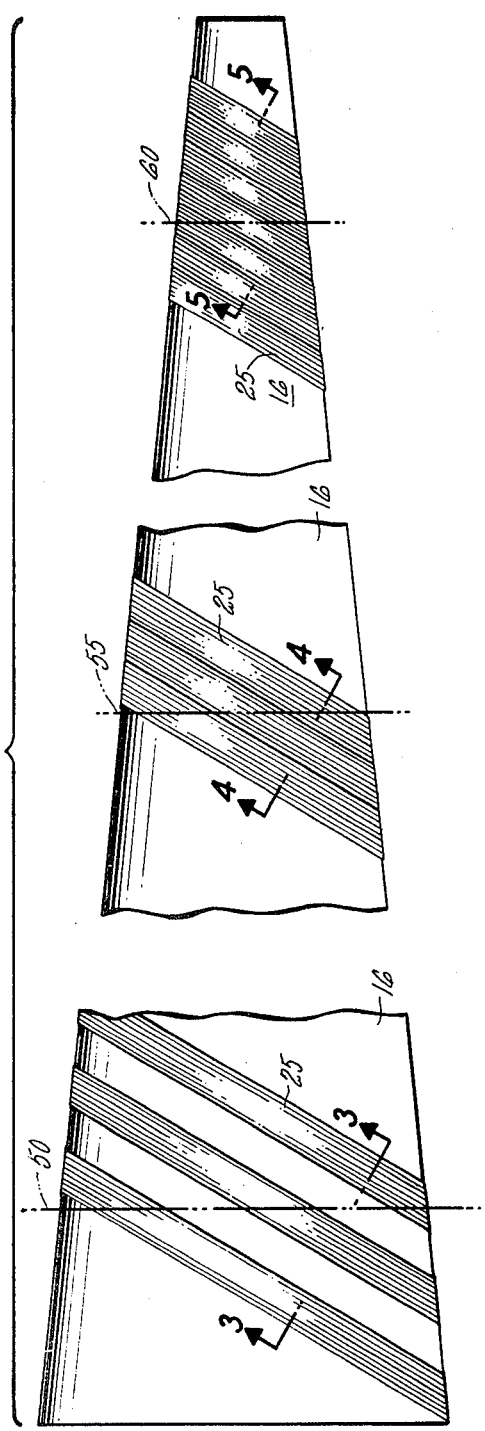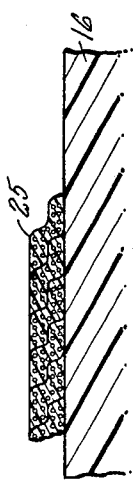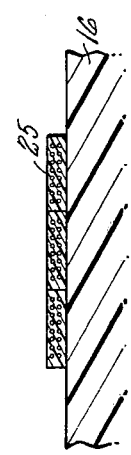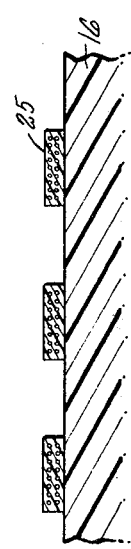

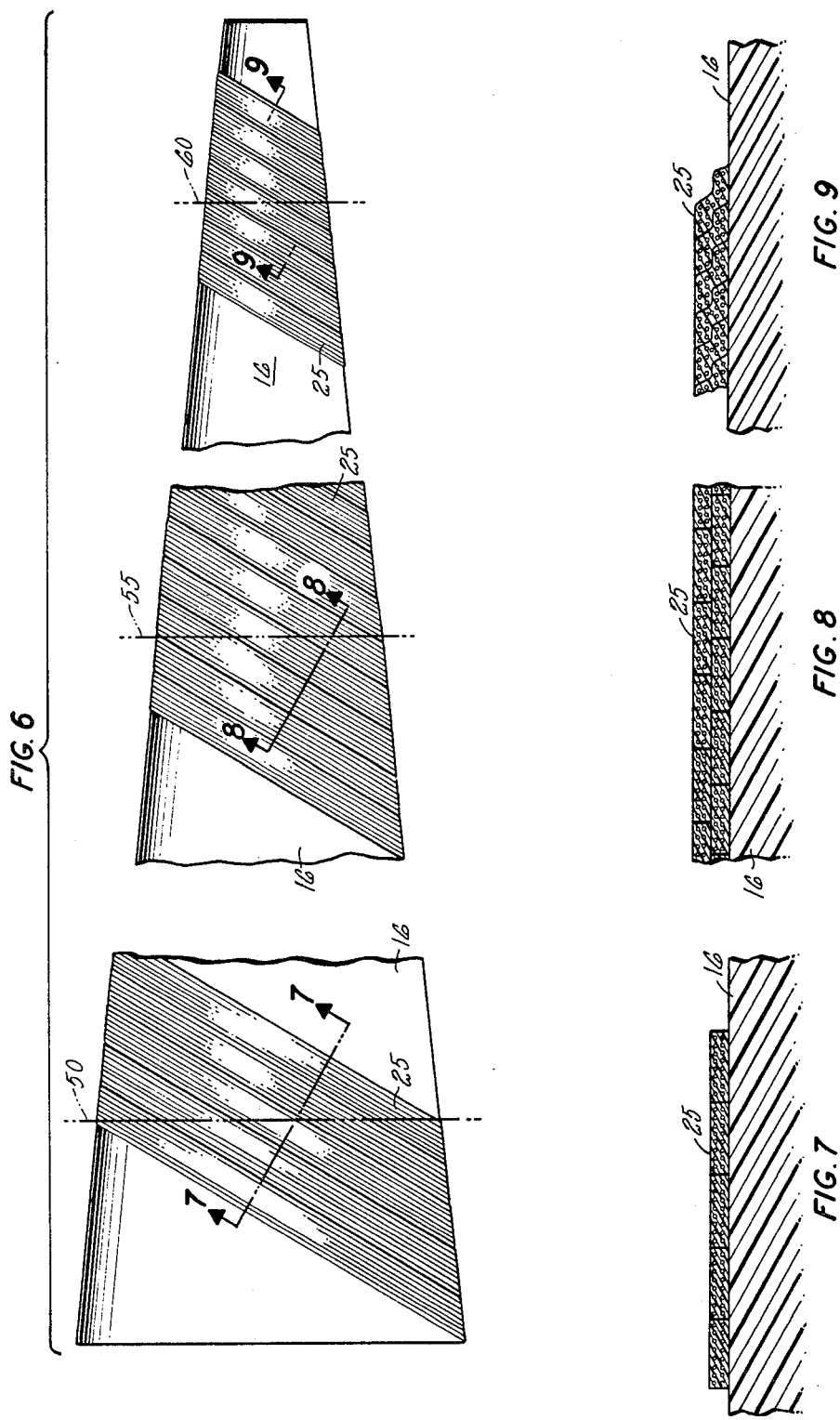

METHOD OF MANUFACTURING A FILAMENT WOUND ARTICLE

This application is being filed of even date with U.S. patent application Ser. No. 334,606 entitled Method of Manufacturing a Filament Wound Article in the names of Dale Evans Smith and Warren Hill Pinter.

TECHNICAL FIELD

This application relates in general to a method of manufacturing an article by filament winding and more particularly to such a method employed in the manufacture of articles of longitudinally tapered shape.

BACKGROUND ART

In modern manufacturing methods, for the production of articles of enhanced strength, filament winding techniques are often employed. Such techniques involve the winding of high strength filaments disposed in a matrix of binder material about a form or mandrel of a shape generally corresponding to the required shape of the finished article, and then the curing of the matrix material. In the case of the manufacture of an elongate article such as an airfoil by such filament winding techniques, as the filaments are wound around the form, the form and filaments may be reciprocally displaced relative to one another along the form's longitudinal or winding axis, thereby forming a plurality of plies of filamentary material, the filaments of each ply being angularly offset from the longitudinal or winding axis of the form as well as from the filaments of adjacent plies. To achieve a continuous reciprocation of the filaments along the form as the filaments are wound thereon, turnarounds or winding rings are employed at the ends of the form or the segment of the form being wound, overlying end turns of the various layers being constructed by winding the filaments over the edges and across an outer face of the winding ring while reversing the direction of the longitudinal displacement between the fibers and the form.

Where the article being wound is of a longitudinally tapered shape as are modern wind turbine blades, a continuous winding of the filaments about the form while maintaining mutual reciprocation between the filaments and the form would, as those skilled in the art will recognize, result in a thicker build-up of material at the smaller end of the form than at the larger end. Frequently, this is undesirable. For example, where the wound article is a wind turbine blade to minimize stresses in the blade due to centrifugal loading, it is required that the smaller blade tip be made thinner than the larger blade root. In the prior art, in winding an article such that a smaller tip portion is thinner than a larger root portion, it is the practice to wind the article from a multiplicity of truncated, continuous, filamentary layers. That is, for example, a first complete layer is deposited by winding the filamentary material on the form over substantially the entire length thereof. Thereafter, a second continuous layer is wound about the mandrel over only a portion thereof, the uncovered first layer defining the smaller tip portion of the article being manufactured. Subsequently, a third continuous layer is wound over a portion of the form such that portions of the first and second plies remain exposed. It will be seen that such a method of winding a tapered article of decreasing thickness from larger to smaller ends results in the article having a cross-section or thickness profile of stepped or cascaded shape. With known winding techniques, the height of each step is equivalent to the number of thicknesses of filamentary material required to form a complete, continuous layer. While such a method may allow the manufacturer to roughly approximate an optimum (desired) thickness profile of the article, a method whereby a desired thickness profile is more closely approximated is desirable.

Another method of winding an article while closely controlling the tapering thickness profile is that of utilizing thinner filamentary material (rovings) in the winding operation. However, the requirements of handling such rovings would severely detract from the efficiency of the winding method of manufacture by increasing the number of layers and thus winding time required.

DISCLOSURE OF INVENTION

Accordingly, among the objects of the present invention is the provision of an improved method of manufacturing a filament wound article wherein a desired thickness profile may be more closely approximated than would be possible with prior art filament winding techniques.

In accordance with the present invention, this and other objects are achieved by an improved method for manufacturing a filament wound article of tapered thickness profile by winding overlying filamentary layers in a stepped or cascaded thickness profile wherein those portions of the wound layers which are covered by subsequent layers include incomplete or discontinuous portions thereof whereby the portions of those layers which are not covered by overlying wound layers are of a minimum thickness for enhanced accuracy in the approximation of a desired (designed) thickness profile. The method may be practiced by winding a plurality of layers, each formed by a number of plies which cross over one another in angularly offset dispositions or, alternatively, by winding a plurality of layers each comprising a multiplicity of parallel wound plies.

The foregoing and other features and advantages of the present invention will become more apparent from the following detailed description and accompanying drawing.

BRIEF DESCRIPTION OF THE DRAWINGS

FIG. 2 is a fragmentary elevation of an article being formed by a filament winding in accordance with the present invention.

FIG. 3 is a sectional view taken along line 3—3 of FIG. 2.

FIG. 4 is a sectional view taken along line 4—4 of FIG. 2.

FIG. 5 is a sectional view taken along line 5—5 of FIG. 2.

FIG. 6 is a fragmentary elevation of the article shown in FIG. 2 after further filament winding steps in accordance with the method of the present invention.

FIG. 7 is a sectional view taken along line 7—7 of FIG. 6.

FIG. 8 is a sectional view taken along line 8—8 of FIG. 6.

FIG. 9 is a fragmentary enlarged sectional view taken along line 9—9 of FIG. 6.

BEST MODE FOR CARRYING OUT THE INVENTION

Figure 1:
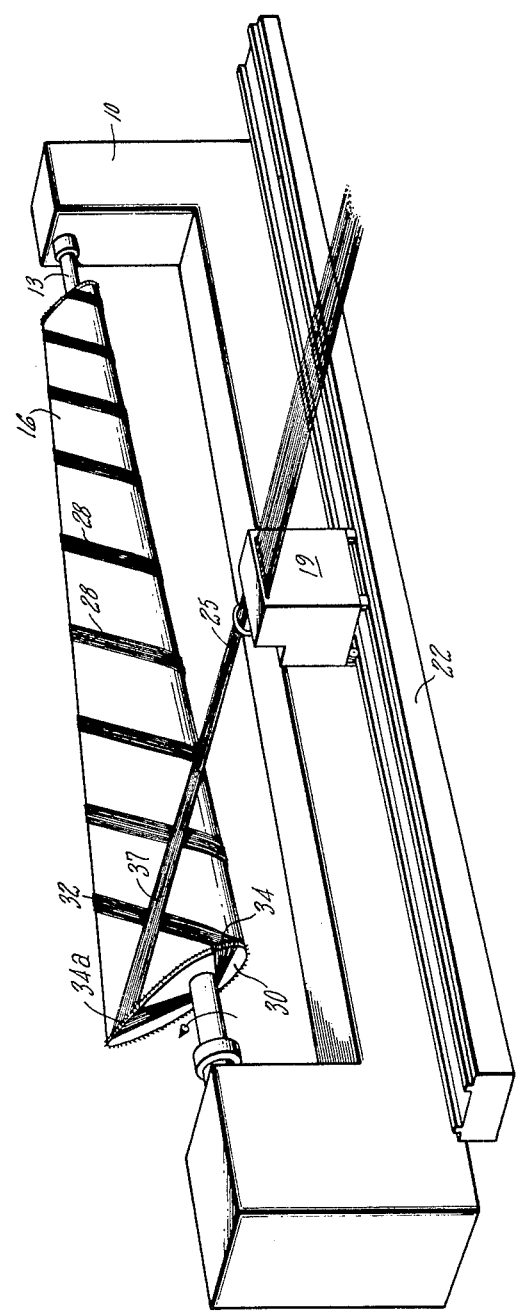
FIG. 1 is a perspective view of an article being constructed by the method of the present invention.

Referring to FIG. 1, a tapered elongate article is shown being manufactured by the method of filament winding of the present invention. In this case, by way of example the article is a tapered airfoil blade such as employed in large wind turbine blades. The method is practiced on a winding machine 10 comprising a rotatable spindle or shaft 13 on which a form 16 is mounted such that the form rotates with the spindle about a longitudinal or winding axis through the form. Winding machine 10 also includes a carriage or winding head 19 which traverses the length of the winding machine by reciprocal rectilinear motion along tracks 22. Winding head 19 receives a plurality of continuous filaments or rovings 25 such as glass fibers or the like from a suitable source thereof (not shown), coats the rovings with a suitable binder such as epoxy or other appropriate substance such that the fibers are collectively disposed within a matrix of binder in a manner known in the art. The fibers are applied to the form in a band comprising a single or multiple overlying layers of juxtaposed rovings, in single strands or bundles. The airfoil formed in accordance with this method comprises a plurality of wound layers of the filamentary material. As shown, the turns of the ply being wound on the form are angularly offset with respect to those of the ply previously wound on the form. It will be readily understood that such angular displacement of the turns is produced by the longitudinal motion of the winding head with respect to the form, the velocity of the winding head relative to the rotational velocity of the form determining the angular orientation of the turns.

In winding the first ply (the first circuit of turns along the length of the form), ends of the filaments treated with binder are secured to the right hand of the form and the form is rotated about its longitudinal axis as the winding head traverses the length of the form from right to left. As the winding head approaches a turnaround or nail ring 30, it lays down an end turn 32 of the filamentary material. As the winding head passes the end of the form, the filaments are captured by one or more spikes outstanding from the edge of the turnaround. After passing the turnaround, the winding head reverses direction thereby winding the filaments across the outer face of the turnaround whereupon the fibers are captured by a number of spikes displaced from those on which the filaments were first captured. As the winding head continues this motion, it traverses the form from left to right starting with the winding of end turn 37 which crosses over end turn 32. Continued traversal of form 16 by winding head 19 while the form rotates on the spindle produces a second ply or circuit of spaced turns of the filamentary material. The reciprocating traversal of the form by the winding head is repeated, laying down various overlying plies of spaced roving turns each ply or circuit being angularly offset with respect to the next preceeding circuit. Thus, it will be understood that a third ply is laid down after traversal of the form from left to right by winding head 19 and reversal of the direction of winding head movement. It will be understood that the turns of the third ply will be generally parallel to the turns of the first ply but crossing over the second ply turns. In this manner, the turns of each ply are wound parallel to the turns of previous plies or circuits associated with traversal of the form by the winding head in a common direction.

The method of the present invention may also be practiced by effecting a reciprocating relative rotation of the form with respect to the unwound band (winding head) such that each change of direction of longitudinal displacement of the winding head with respect to the form along the winding axis is accompanied by a reversal in the direction of rotation of the form. Thus, as the winding head reaches the extent of its longitudinal travel and reverses direction, the form reverses its direction of rotation on spindle 13 and therefor, all the turns wound on form 16 are generally parallel, thereby eliminating mutual crossovers of the turns. This method is described in further detail in U.S. patent application Ser. No. 334,606 filed Dec. 28, 1981 in the names of Dale Evans Smith and Warren Hill Pinter and entitled "Method of Manufacturing a Fialament Wound Article."

As set forth hereinabove, when a tapered article such as a tapered airfoil blade is wound from overlying complete layers of filamentary material, the thickness of the wound material is inversely proportional to the perimeter of the form. Where the winding angle is held constant, this relationship can be expressed generally by the equation $$P_1 t_1 = P_2 t_2$$

where $P_1$ is the measure of the perimeter or girth at station 1, $P_2$ is a measure of the perimeter or girth at station 2, $t_1$ is the average thickness of the wound material at station 1 and $t_2$ is the average thickness of wound material at station 2. Accordingly, it is seen that for a tapered article such as the wind turbine airfoil blade herein, in accordance with this relationship the tip portion of the blade would be substantially thicker than the root portion thereof. Usually, since the tip portion is stressed less than the root portion, the opposite is desired. That is, it is usually desired to make the tip portion substantially thinner than the root portion. With prior art filament winding techniques, this can be achieved by winding a lesser number of complete layers at the tip portion than the root and mid portions. For example, a first complete layer can be wound along the entire length of the form and a second complete layer can be wound from the root to a station on the form beyond which only one layer of material is required. Then, a third complete layer can be wound on the second layer from the root to a station on the blade beyond which only the first two layers are desired. In this manner, a stepped or cascaded construction is obtained. Of course, it will be readily appreciated that the accuracy with which this stepped or cascaded thickness profile approximates a generally smooth, corresponding design (desired) profile is limited by the thickness of the wound layers. For a tapered structure such as the wind turbine blade discussed hereinabove, as illustrated by the above relationship of thickness to form perimeter, it will be seen that filamentary layers wound on the form may be many times thicker at the tip portion than is desired due to the difference in perimeter of the form between the tip and root portions. Similarly, since, in prior art methods of winding a plurality of overlying layers of decreasing length to form a stepped approximation of the required thickness profile, the step heights are equivalent to the thickness of complete filamentary layers, such steps often represent only very crude approximations of a continuous thickness profile called for by the analytical design of the component.

By means of the present invention, step height is substantially reduced and the filament wound article is characterized by a thickness profile which approximates a smooth design profile more closely than can be approximated by prior art winding techniques. In accordance with this invention, a number of overlying "partial layers" are formed, such partial layers including continuous portions at lesser form girths and discontinuous portions at greater form girths which are subsequently covered by other partial layers. In this manner, the heights of the wound steps which approximate the desired thickness profile are materially reduced from the step heights associated with complete filamentary layers and an enhanced approximation of a smooth desired thickness profile is attainable.

Referring to FIGS. 2-5, in practicing the present invention, first 50, second 55, and third 60 stations on the form are defined, the second station 55 being disposed between the first and third stations. The girth of the form at the first station 50 is greater than that at the third station 60. In the example illustrated in FIGS. 2-5, the girth at station 50 shall, for purposes of illustration, be considered to be twice that at station 55 and four times that at station 60. Once the stations are defined, the filamentary material is continuously wound about the form in either of the methods described hereinabove with respect to FIG. 1. In FIGS. 2-5, the winding head and filamentary band carried thereby reverse longitudinal direction, simultaneously with rotational reciprocation of the form so that succeeding plies or circuits of filamentary turns are disposed parallel to one another. The filamentary band of any suitable width or thickness is wound continuously about the form between the first and third stations until the entire girth of the form at the second station is covered with a layer of filamentary material of desired thickness while portions of the girth of the form in the area of the first station remain uncovered with material. This forms one of the "partial layers" set forth hereinabove. In FIGS. 2-5 in accordance with the above formula, since the perimeter or girth at station 60 is one half that at station 55, where the girth is covered by a continuous disposition of a single thickness of the filamentary band, the turns at station 60 overlie one another to the extent that at station 60, a double thickness of the filamentary band is wound. However, since the girth at station 50 is twice that of 55, where station 55 is covered with the material, station 50 is only approximately half covered. Referring to FIGS. 6-9, the filamentry band is then wound between stations 50 and 55 until the girth of the form at the first station is completely covered with filamentary material. Thus, as best seen in FIG. 7, upon completion of this step, the form at station 50 is covered by a single layer of band while at station 55 the form is covered with a double thickness of the filamentary band.

It is seen then that when the form is wound in accordance with the method of the present invention, all stations of the form are completely covered yet at station 60, the form is covered with only a double band of thickness of material. With prior art methods, where only complete layers would be wound before overlying layers were wound between stations 50 and 55, the minimum thickness at station 60 would be four band thicknesses since the perimeter at station 60 is one fourth that at station 50. Thus, it is seen that when an entire article is formed by filament winding in accordance with the method of the present invention, the height of the steps which would approximate the desired thickness profile is substantially less than those of prior art techniques so that a desired thickness profile may be much more closely approximated than was possible heretofore. In the example illustrated in FIGS. 2-9, it is seen that the first such step is only of a double band thickness while as has been shown, with prior art techniques of winding overlying complete continuous layers, the first step would be of four band thicknesses.

Figure 10:
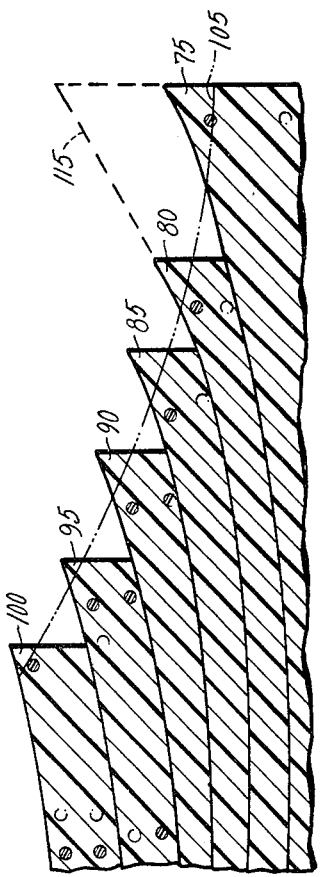
FIG. 10 is a fragmentary sectional view of an article manufactured in accordance with the method of the present invention.

Referring to FIG. 10, the improved approximation of a desired thickness profile attainable with the method of the present invention is shown. In FIG. 10, a profile of the tip portion of a filament wound airfoil blade is illustrated. Steps 75-100 represent the partial layers formed in accordance with the method of the present invention. That is, the exposed portion of each step represents a complete (continuous) distribution of wound filaments, while that portion of each step covered by an overlying layer as described hereinabove, includes open or incomplete areas thereof. Line 105 represents a desired thickness profile from, for example, analytical design techniques. Line 115 represents the profile of an end of the wind turbine blade wound which would be obtained from rovings of uniform thickness with prior art techniques. It is readily seen with such prior art techniques, wherein complete continuous layers are wound, the tip thickness is substantially greater than the thickness at an interior location. Thus, it is seen that with such prior art techniques, the thickness profile at the end would not even grossly approximate the desired thickness profile. However, it is seen that the method of the present invention, the winding of partial layers i.e. those having discontinuities where the layer is covered by subsequent layers, allows step sizes to be much smaller than heretofore known and, as those skilled in the art will appreciate, such a smaller step size enables much closer approximation to a desired profile. Moreover, the smaller step sizes reduce the number and sizes of voids established thereby enhancing the stength of the wound article.

Figure 11:
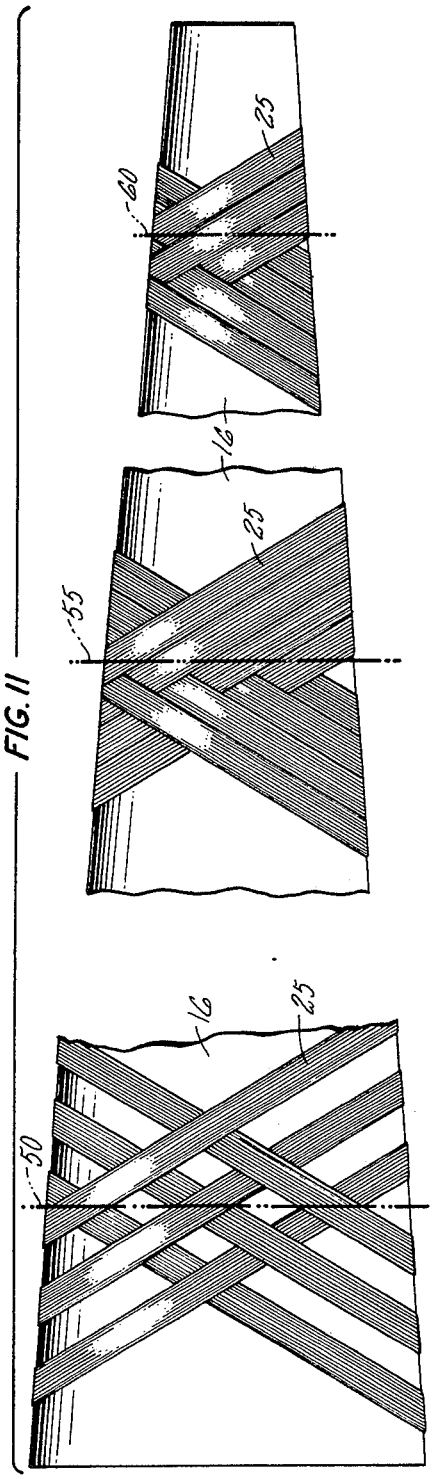
FIG. 11 is a fragmentary elevation of an article being manufactured in accordance with an alternate embodiment of the method of the present invention.

While the present invention has been described with filament winding techniques wherein all plies or circuits are wound on the form in generally parallel directions, it will be readily understood by those skilled in the art that this method is equally suitable for crossover type winding techniques wherein each ply or wound circuit is angularly offset from the adjacent plies such that a "basket weave" dispositions of the filament band is achieved. FIG. 11 discloses such band distribution. As set forth hereinabove this band disposition is obtained when the winding head reciprocates longitudinally with respect to the form while the direction of form rotation remains constant. In FIG. 11, stations 50, 55 and 60 are shown, the form at station 50 including open areas or discontinuities between the bands. At station 55, the bands are of a double thickness while at station 60, the filamentary thickness is equivalent to four band thicknesses. The open areas and overlying or crossover bands at station 50 average out to a single band thickness which, with the double band thickness at station 55 and the quadruple band thickness at station 60, is consistent with the relationship of wound fiber thickness and form girth set forth hereinabove. Those skilled in the art will appreciate that the attributes of decreased step size for accurate approximation of design thickness profiles are attained with this crossover method of winding as readily as they are attained with the parallel band winding method described hereinabove.

It will be understood that the above-noted relationship between wound thickness and form girth or local circumference is provided herein for illustrative purposes only and does not limit the present invention. Thus, it will be appreciated that the present invention may be practiced with varying winding angles without any sacrifice of the benefits obtained by the winding of the hereinabove described partial layers in the stepped or cascaded disposition set forth herein.

Having thus described the invention, what is claimed is:

1. A method of forming a tapered filament wound article by winding a band of juxtaposed filaments about a form having a longitudinal winding axis, said method being characterized by the steps of:
   (a) defining first, second and third longitudinally spaced stations on said form, said second station being located between said first and third stations, the girth of said form at said first station being greater than at said third station.
   (b) continuously winding said filament band about said form between said first and third stations until the entire girth of said form at said second station is covered with a layer of said filamentary material of desired thickness while portions of the girth of said form at said first station remain uncovered with said filamentary materials and
   (c) continuously winding said filament band about said form between said first and second stations until the entire girth of said form at said first station is covered with a layer of said filamentary material of desired thickness.

2. The method of claim 1 characterized by effecting a reciprocating relative displacement of said band and said form along said winding axis while said filament band is wound between said first and third stations and said first and second stations.

3. The method of claim 2 characterized by said winding of said filament band about said form being effected by attachment of said band to said form and reciprocating relative rotation of said form with respect to said band such that each change of direction of displacement of said band and form along said winding axis is accompanied by a reversal in the direction of relative rotation therebetween, thereby maintaining a uniform angular disposition of said filamentary material on said form.

4. The method of claim 3 characterized by the desired thickness of said layer of filamentary material at said second station being equal to the thickness of a single layer of said filament band.

5. The method of claim 2 characterized by the maintenance of a uniform direction of relative rotation between said form and said band whereby said reciprocating relative displacement of said band and said form along said winding axis causes successive plies wound on said form to be angularly offset with respect to one another.

6. The method of claim 5 characterized by said uncovered portions of the girth of said form at said first station comprising spacings between parallel turns of said band in alternate plies.

* * * * *